(12) United States Patent
Srutkowski et al.

(10) Patent No.: US 8,687,933 B2
(45) Date of Patent: Apr. 1, 2014

(54) FIELD TERMINATED FIBER PATCH PANEL FOR RACK AND WALL MOUNTING

(75) Inventors: Lawrence Srutkowski, Florence, SC (US); Ted Lichoulas, Simpsonville, SC (US); Chuck Turner, Greenville, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 40 days.

(21) Appl. No.: 12/810,472

(22) PCT Filed: Jan. 5, 2010

(86) PCT No.: PCT/US2010/020075
§ 371 (c)(1),
(2), (4) Date: Jun. 24, 2010

(87) PCT Pub. No.: WO2010/080745
PCT Pub. Date: Jul. 15, 2010

(65) Prior Publication Data
US 2011/0044598 A1 Feb. 24, 2011

Related U.S. Application Data

(60) Provisional application No. 61/143,214, filed on Jan. 8, 2009.

(51) Int. Cl.
*G02B 6/00* (2006.01)
(52) U.S. Cl.
USPC .......................................... 385/135; 385/134
(58) Field of Classification Search
None
See application file for complete search history.

(56) References Cited

U.S. PATENT DOCUMENTS

| | | | | |
|---|---|---|---|---|
| 5,142,606 A | * | 8/1992 | Carney et al. | 385/134 |
| 5,145,197 A | * | 9/1992 | Gatti | 280/304.1 |
| 5,497,444 A | * | 3/1996 | Wheeler | 385/135 |
| 6,301,424 B1 | * | 10/2001 | Hwang | 385/135 |
| 6,785,459 B2 | | 8/2004 | Schmidt et al. | |
| 7,087,840 B2 | | 8/2006 | Herring et al. | |
| 8,452,148 B2 | * | 5/2013 | Cooke et al. | 385/135 |
| 2003/0223723 A1 | * | 12/2003 | Massey et al. | 385/135 |
| 2006/0018622 A1 | * | 1/2006 | Caveney et al. | 385/135 |
| 2006/0025010 A1 | | 2/2006 | Spitaels et al. | |
| 2007/0227992 A1 | * | 10/2007 | Mimlitch et al. | 211/153 |
| 2008/0085094 A1 | * | 4/2008 | Krampotich | 385/135 |
| 2008/0247723 A1 | * | 10/2008 | Herzog et al. | 385/135 |
| 2008/0311786 A1 | * | 12/2008 | Laursen | 439/501 |
| 2009/0067800 A1 | * | 3/2009 | Vazquez et al. | 385/135 |

* cited by examiner

*Primary Examiner* — Uyen Chau N Le
*Assistant Examiner* — Chad Smith
(74) *Attorney, Agent, or Firm* — Sughrue Mion, PLLC

(57) ABSTRACT

The fiber optics patch panel assembly includes a pair of patch panels each having a base and a pair of first sides. A wall attachment portion is disposed on the base of each panel, and a mounting portion disposed on each of the first sides of each of the panels. A rack mounting bracket is attached to the mounting portion of one of the first sides of each of the panels. A panel attachment is attached to the mounting portion of an other of the first sides of each of the panels and attaches the panels to one another. A single panel can be wall-mounted, or rack mounted in a standard rack mount assembly using two panels and the rack mounting bracket, or mounted in a half-sized custom rack without needing any modifications.

8 Claims, 2 Drawing Sheets

_FIELD TERMINATED FIBER PATCH PANEL FOR RACK AND WALL MOUNTING_

CROSS-REFERENCE TO RELATED PATENT APPLICATION

This application claims the benefit of Provisional Application No. 61/143,214 filed Jan. 8, 2009, in the United States Patent and Trademark Office, the disclosure of which is incorporated by reference in its entirety.

BACKGROUND

1. Field of the Invention

The present invention relates to a fiber patch panel. More particularly, it relates to a fiber patch panel that is mountable on a rack and a wall.

2. Background of the Invention and Related Art

Fiber optic patch panels take fiber bundles and terminate them in a format that makes the individual fibers accessible, generally by terminating the fiber into a standardized connector which is then inserted into the appropriate adapter for the connection. Currently, patch panel products are application specific; that is, either the housing is designed to mount to a wall or a rack, but not both. This causes contractors to hold inventory of two types of patch panels. Furthermore, when used in outside plant enclosures, only custom solutions are available.

Accordingly, there remains a need for a fiber patch panel that is mountable on a rack as well as a wall without requiring substantial modifications.

SUMMARY OF THE INVENTION

One object of the exemplary embodiments of the present application is to provide a fiber optic patch panel that is mountable on a rack, a wall, or in many custom outdoor racks without requiring substantial modifications.

Another object of the exemplary embodiments of the present application is to provide a fiber optic patch panel that is easily accessible even when mounted in a stacked arrangement with a plurality of additional patch panels.

One aspect of the exemplary embodiments provides a patch panel including a housing comprising a base and a pair of first sides extending perpendicularly from the base, wherein the base includes at least one wall attachment portion and the first sides each include a rack mounting portion.

Another aspect of the exemplary embodiments provides a patch panel assembly including a pair of panels each including a base and a pair of first sides extending perpendicularly from the base; a wall attachment portion disposed on the base of each panel; and a mounting portion disposed on each of the first sides of each of the panels. A rack mounting bracket is attached to the mounting portion of one of the first sides of each of the panels, and a panel mounting bracket is attached to the mounting portion of an other of the first sides of each of the panels and attaching the panels to one another.

It is intended that any other advantages and objectives of the present invention that become apparent or obvious from the detailed description or illustrations contained herein are within the scope of the present invention.

DETAILED DESCRIPTION OF EXEMPLARY EMBODIMENTS OF THE PRESENT INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

FIGS. 1-4 illustrate exemplary embodiments of the patch panel of the present invention. The patch panel can be used in wall mounting applications, rack mounting applications, and outside plant closure applications, without the need for modification, solving inventory problems.

Figure 1:
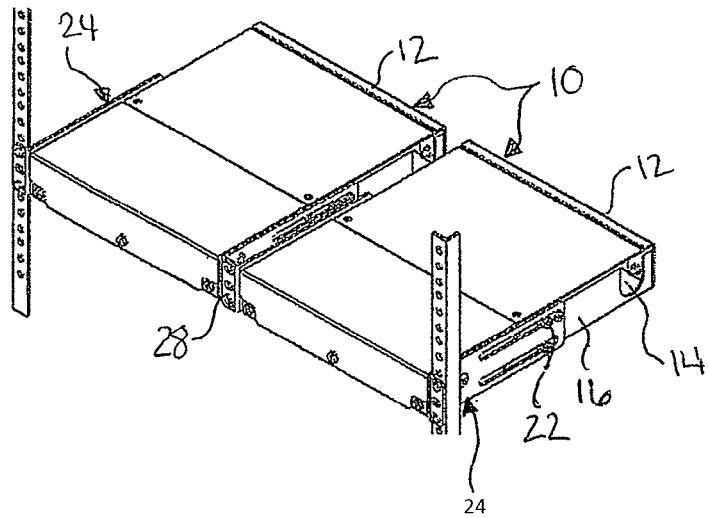
FIG. 1 is a perspective view of an exemplary embodiment of a pair of patch panels of the present invention mounted on a rack illustrating both of the panels in a flush-mounted position.

With reference to FIG. 1, a fiber optics patch panel 10 includes a housing 12 that has a base 14, and a pair of opposing first sides 16 extending perpendicularly from the base 14. One or more bulkheads (not shown) may be housed within the housing 12 for connecting bundles of optical wires (not shown), and the like. The panel 10 may also include a pair of opposing second sides 18 extending perpendicularly from the base 14 and perpendicular to the first sides 16.

Figure 2:
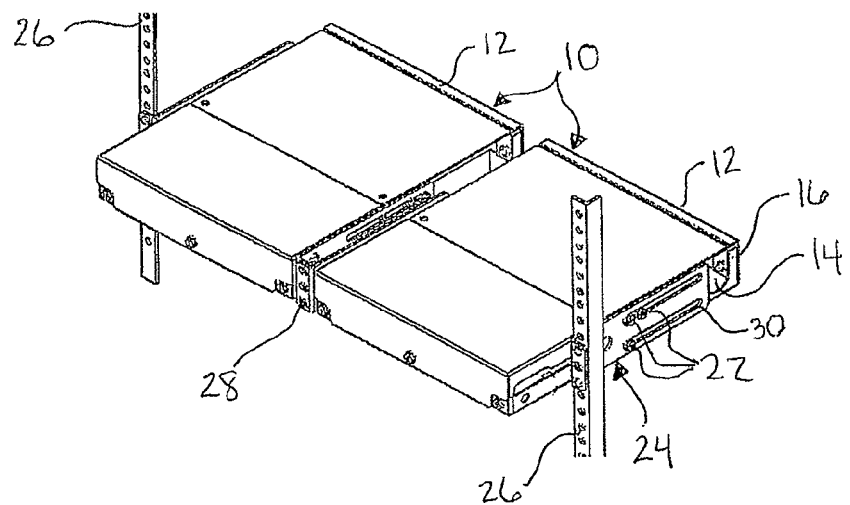
FIG. 2 is a perspective view of the exemplary embodiment of FIG. 1 illustrating both of the panels in an extended forward position.
Figure 3:
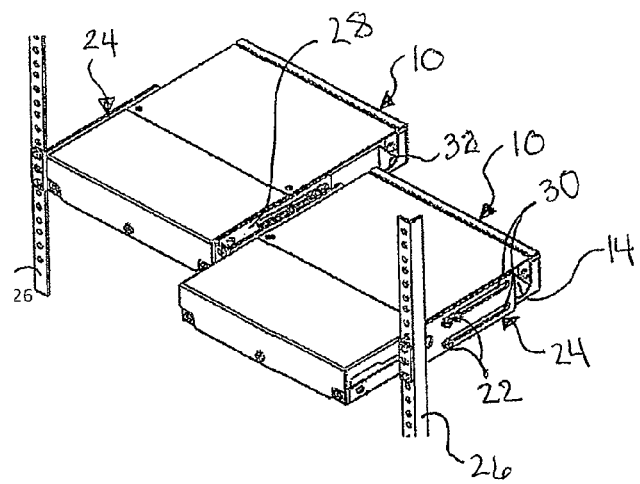
FIG. 3 is a perspective view of the exemplary embodiment of FIG. 1 illustrating one of the panels in an extended position and one of the panels in a flush-mounted position.
Figure 4:
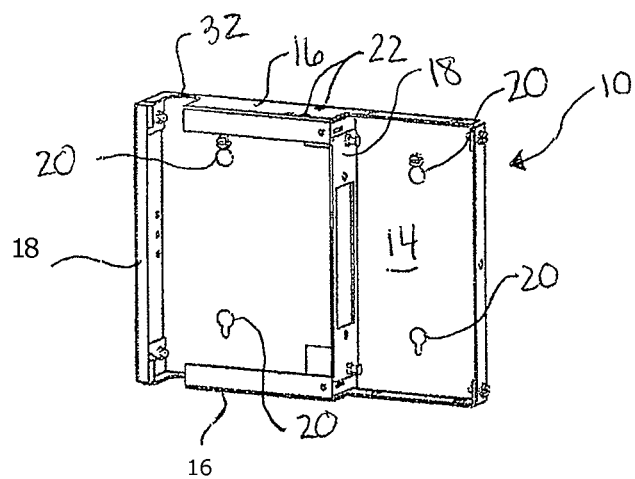
FIG. 4 is a perspective view of an exemplary embodiment of the present invention illustrating the patch panel mounted to a wall.

As shown in FIG. 4, the base 14 includes a plurality of wall mounting portions 20 for mounting the panel 10 to a wall, or the like. The embodiment of FIG. 4 illustrates an exemplary embodiment wherein the four wall mounting portions 20 are tear-drop shaped through holes that are flush with the base 14 and are in spaced arrangement relative to one another. The through holes in the base 14 of the panel 10 allow the panel 10 to be attached directly to a wall without the need for additional mounting brackets or any further modifications. In FIGS. 1-3, the base 14 is located at an underside of each of the panels 10 and thus, the wall mounting portion 20, although included, is not shown.

Those skilled in the art would understand that the wall mounting portion 20 is not limited to the through holes illustrated in the exemplary embodiment of FIG. 4. For example, the wall mounting portion 20 may instead include one or more embossed or debossed portions (not shown) that each include a slot or through hole. More specifically, an embossed portion, i.e., a portion of the base that is raised in a direction away from the wall, may include a through hole at a top thereof for receiving a mount on a wall, or a debossed portion, i.e., a portion of the base that is indented in a direction toward the wall, may include a through hole at a bottom portion thereof for receiving the mount on the wall. Another alternative for the mounting portion 20 may be one or more snap connecting portions (not shown) that are configured to snap into and out of a plate disposed on the wall, or other such wall mount.

Each of the first sides 16 includes a mounting portion 22. In the exemplary embodiments shown in FIGS. 1-4, the mounting portion 22 is a plurality of elongated through holes extending through each first side 16.

The panel 10 includes a rack attachment bracket 24 detachably attached to the mounting portion 22 of one of the first sides 16 of each panel 10 to mount the panel 10 to a rack 26.

A panel attachment 28 may be detachably attached to the mounting portion 22 of the other of the first sides 16 to mount the panel 10 to a second panel 10. That is, the mounting portion 22 attaches the panel 10 either to another panel 10 or to a rack 26. The panel attachment 28 may be one of many commonly-known fasteners. In the exemplary embodiments, the panel attachment 28 is a plurality of bolts that extend through the holes on each side 16, and corresponding nuts. However, those skilled in the art would understand many other arrangements for the mounting portion 22 and the panel attachment 28 that would detachably attach two panels 10 to one another, such as a screw, a clevis pin, etc.

In the exemplary embodiments of FIGS. 1-3, the rack attachment bracket 24 is a plate that includes at least one slot 30, and the mounting portion 22 on each first side may be a through hole in combination with a projection extending through the through hole that engages and slides within the slot 30 of the rack attachment bracket 24. However, it is understood that other arrangements that allow the panel 10 to slide relative to the rack 26 may be within the scope of the present application. For example, the rack attachment 24 may include a projection and the first side may include a slot as the mounting portion 22. Alternatively, the mounting portion 22 may be a projection extending directly from a surface of the first side 16.

The width of the base 14 is one-half of the width of a standard rack mounting assembly in a 19 inch rack. Two panels 10 are attached to one another side by side through a panel attachment 28 whereby the two attached panels 10 fit into a single rack width.

The exemplary embodiments of the panel 10 may be wall-mounted, as shown in FIG. 4, in which case the base 14 of the panel 10 is positioned vertically, or instead can be rack-mounted, as shown in FIGS. 1-3, in which case the base 14 is positioned horizontally. The panel 10 may also be mounted in many outdoor custom racks, which are typically half the width of an industry standard rack; that is, only a single panel 10 may be used to mount the panel 10 to a custom half-sized rack.

When rack-mounted, the patch panel 10 is capable of transitioning from a "flush-mounted" position (shown in FIG. 1) to an extended position (shown in FIG. 3) by sliding relative to the rack 26 on which the panel 10 is mounted. Sliding the panel 10 to the extended position allows the bulkhead to be positioned within reach from a front of the rack 26 when another panel 10 is positioned directly above and in the flush-mounted position. In the exemplary embodiments, the mounting portion 22 is one or more elongated through holes and the panel attachment 28 is a bolt and nut, or clevis pin, whereby the panel attachment 28 slides within the mounting portion 22 so that the panels 10 are slidable relative to one another.

Each of the first sides 16 may include a wire insertion portion 32 for extending optical wires or bundles of wires therethrough. In the exemplary embodiments, the wire insertion portion 32 is a U-shaped slot.

Although the above exemplary embodiments have been described, they are not limiting, and it will be understood by those skilled in the art that the present invention should not be limited to the described exemplary aspects and embodiments, but that various changes and modifications can be made within the spirit and scope of the present invention.

What is claimed is:

1. A patch panel comprising:
   a housing comprising a base and a pair of first sides extending perpendicularly from the base; and
   a rack attachment bracket attached to a mounting portion of at least one of the first sides, wherein:
   the base includes at least one wall attachment portion and the first sides each include the mounting portion,
   the mounting portion comprises at least one elongated through hole extending through each of the first sides in a length direction of the first sides, the mounting portion further comprising a projection extending from the at least one of the first sides,
   a longitudinal axis in which the at least one elongated through hole extends is substantially parallel with the base, and
   the rack attachment bracket includes a slot elongated and extending in the same direction in which the through hole extends and the projection of the mounting portion moves along the slot in a longitudinal direction thereof.

2. The patch panel according to claim 1, wherein the wall attachment portion is a through hole.

3. The patch panel according to claim 1, further comprising a panel attachment attached to the mounting portion of the at least one of the first sides.

4. The patch panel according to claim 1, wherein the housing further comprises a pair of second sides extending perpendicular to the base.

5. A patch panel assembly comprising:
   a pair of panels each including a base and a pair of first sides extending perpendicularly from the base;
   a wall attachment portion disposed on the base of each panel;
   a mounting portion disposed on each of the first sides of each of the panels;
   a rack mounting bracket attached to the mounting portion of one of the first sides of each of the panels; and
   a panel attachment attached to the mounting portion of the other of the first sides of each of the panels and attaching the panels to one another,
   wherein the mounting portion comprises at least one elongated through hole extending through each of the first sides and a projection extending from the one of the first sides of each of the panels, and a longitudinal axis in which the at least one elongated through hole extends is substantially parallel with the base, and
   wherein the rack mounting bracket includes a slot elongated and extending in the same direction in which the through hole extends and the projection of the mounting portion moves along the slot in a longitudinal direction thereof.

6. The assembly according to claim 5, wherein the panel attachment slidably attaches the panels to one another.

7. The assembly according to claim 5, wherein the rack mounting bracket is slidably attached to the mounting portion of the one of the first sides of each of the panels.

8. The assembly according to claim 5, wherein the mounting portion is a plurality of through holes extending through the first side, and the wall attachment portion is a plurality of through holes.

* * * * *